June 4, 1968  E. S. WATSON  3,386,332
DIFFERENTIAL REFRACTOMETRY
Filed July 13, 1964  2 Sheets-Sheet 1
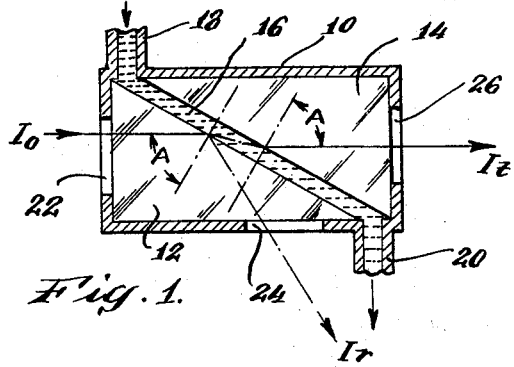
Fig. 1.
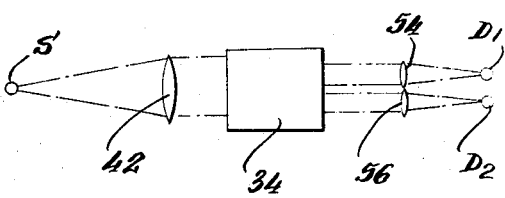
Fig. 6.
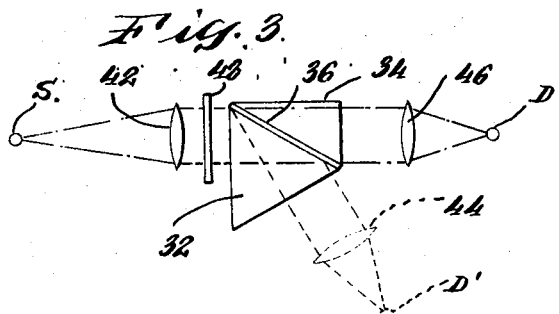
Fig. 3.
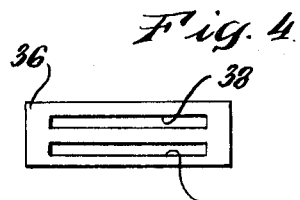
Fig. 4.
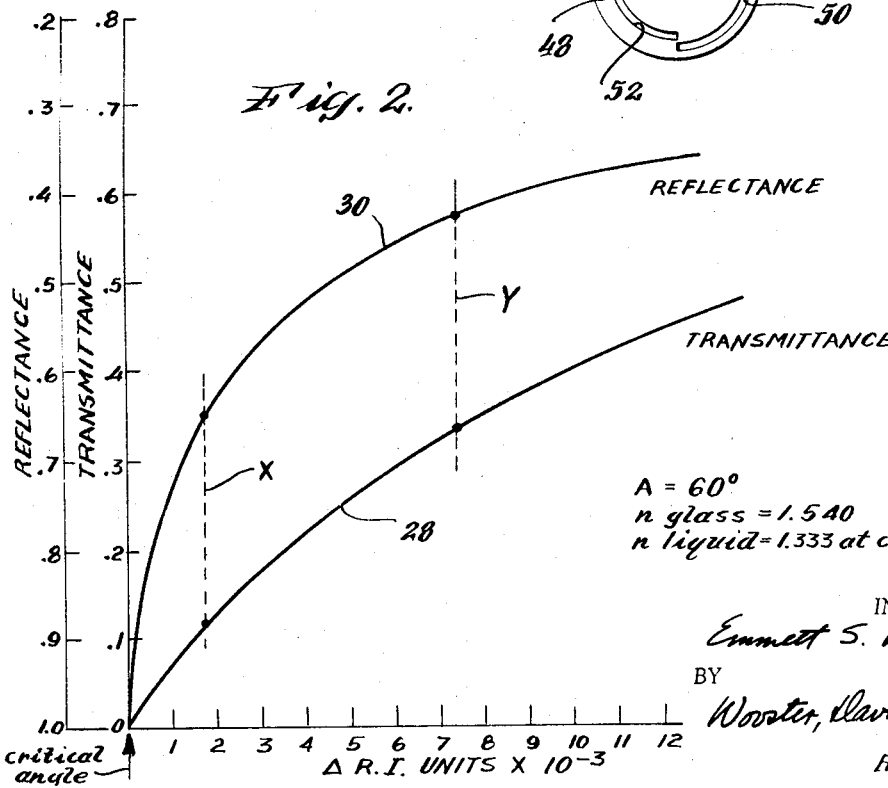
Fig. 2.
Fig. 5.
$A = 60°$
$n\ glass = 1.540$
$n\ liquid = 1.333$ at critical angle
INVENTOR.
Emmett S. Watson
BY
Wooster, Davis & Cifelli
ATTORNEYS.

June 4, 1968  E. S. WATSON  3,386,332
DIFFERENTIAL REFRACTOMETRY
Filed July 13, 1964  2 Sheets-Sheet 2

INVENTOR.
Emmett S. Watson
BY
Wooster, Davis & Cifelli
ATTORNEYS

United States Patent Office 3,386,332
Patented June 4, 1968

3,386,332
DIFFERENTIAL REFRACTOMETRY
Emmett S. Watson, 5 Country Club Road,
Ridgefield, Conn. 06877
Filed July 13, 1964, Ser. No. 382,278
9 Claims. (Cl. 88—14)

This invention relates to differential refractometry and, more particularly, to such refractometry which is particularly well suited to the measurement of differing indices of refraction of a fluid sample.

The measurement of refractive index is one of the oldest physical measurements made on materials. There are three basic types of refractometers known to the prior art:

(1) The critical angle type, in which the critical angle is measured, as in the Abbe and Pulfrich refractometers, or in which the reflectance at the interface near the critical angle is measured photometrically and the index calculated from the Fresnel equations.

(2) The spectrometer, or image displacement, type in which the bending of a light beam by a wedge shaped sample is measured.

(3) The interferometer type in which the retardation of one beam which traverses the sample is compared to a reference beam from the same source. From the interference pattern formed by the two beams, the refractive index of the sample can be determined.

Each of the above three types of refractometers can be made to operate in a differential fashion by measuring the difference in index between two sample fluids. Additionally, all three types can be automated by photometric means. A number of automatic differential recording refractometers based on all three of the above types have been designed. However, all such prior art differential refractometers have certain limitations with respect to sensitivity, reproductibility, sample size, and complexity.

The problem of sample size is particularly acute in such fields as chromatography where the output sample from a chromatographic column may be quite small in volume. Accordingly, it would be desirable to provide a differential refractometer having extremely small sample size requirements which could be utilized as a detector for a chromatographic column. In such an application, of course, it is desirable that the refractometer be capable of continuous measurement, high sensitivity, good reproducibility, rapid response, good stability, and incorporate automatic readout. Accordingly, it is the primary object of the present invention to provide a differential refractometer having the above listed advantages. The manner in which this and other objects of the invention are achieved will be more apparent from the following description, the appended claims and the figures of the attached drawing, wherein:

FIG. 1 illustrates the principle of operation of the present invention;

FIG. 2 is a graph illustrating the manner in which the present invention measures differential refractive index;

FIG. 3 is a schematic illustration of one embodiment of the present invention;

FIG. 4 is an illustration of one of the components of the system of FIG. 3;

FIG. 5 is an illustration of another component of the system of FIG. 3;

FIG. 6 is a plan view, partially schematic, of a modification of a refractometer employing the present invention;

Figure 8:
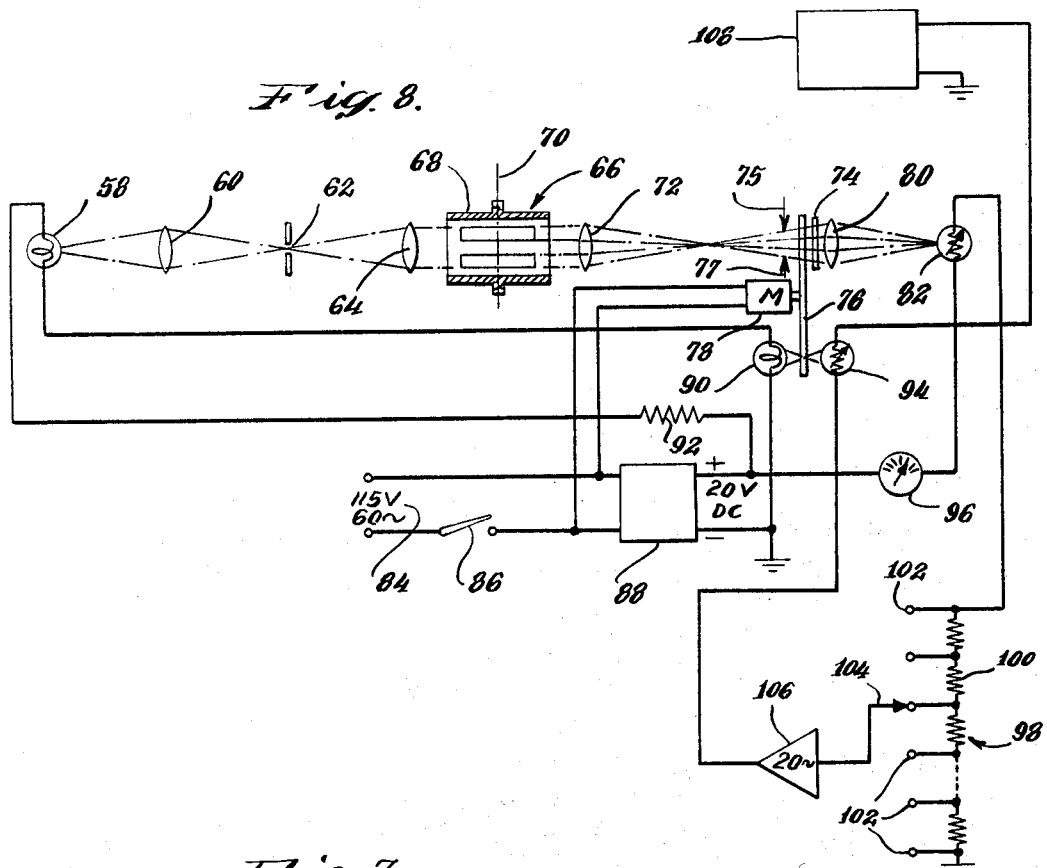
FIG. 8 is a plan view of the refractometer of FIG. 7, with its associated circuitry.

In accordance with the present intervention, there is provided a differential refractometer based on the Fresnel law of reflection wherein light is passed through a sample and a reference fluid which have a common interface with another material of different refractive index. The light is caused to strike the interface near the critical angle so that any change in refractive index of the sample liquid will cause a shift in the intensity of the light which is either reflected from or transmitted through the interface. For a practical instrument, the light should strike the interface at an angle of incidence very slightly less than the critical angle. Photodetectors are positioned either in the transmitted beams or in the reflected beams. The difference between the D.C. outputs of the detectors is then employed to operate a recorder which indicates the difference in refractive index. Alternatively, a chopper may be positioned to alternately pass the sample and reference beams to a single detector. The A.C. variation of the single detector would thus provide the measurement of refractive index difference. Accordingly, four basic variations of the present invention are possible:

(1) Measuring the refracted components using a two D.C. photometer;

(2) Measuring the refracted components using a single detector chopped photometer;

(3) Measuring the reflected components using a two detector D.C. photometer;

(4) Measuring the reflected components using a single detector chopped photometer.

In all cases, the difference signal can be read out directly or used to operate a nulling device (attenuators, "restorer" glass, etc.) whose position is then read out.

Each of the above variants is characterized by the single axis illuminating optics and the single third material which forms a common interfacial boundary with the sample and reference. This affords a symmetry to the measurement which reduces its sensitivity to spurious common mode effects. In the prior art beam deviation method, for example, the two liquids are arranged in tandem rather than side by side. This is not symmetrical as one liquid must be ahead of the other. One consequence of this asymmetry is that the first liquid might be heated more by the source than the second liquid. Another, more important, difficulty is that the single valued direct difference measurement of beam deviation must be made with absolute (as distinguished from "differential") accuracy. This means that the angular stability of the optical axes must be very good.

An alternative to the beam deviation method has been proposed in an article by Jones, Ashman, and Stahley entitled "Recording Refractometer" which appeared in vol. 21, No. 12, of Analytical Chemistry, Dec. 1949. In this approach, the sample and reference are each contacted by a different piece of a third material and the interfaces are illuminated by two beams having separate optical axes. This approach does not solve the problem, however, as the angle between the separate pieces of the third material and the angle between the separate optical axes must then be contended with. Such an instrument is essentially two separate glass-to-liquid Fresnel reflectance instruments mounted side by side and sharing a common source.

FIG. 1 illustrates the manner in which light impinging on an interface near the critical angle is divided into two components in accordance with the Fresnel laws of reflection. In this illustration, a casing 10 contains an entrance prism 12 and an exit prism 14 which have opposed faces spaced apart to form a sample volume 16 therebetween. An inlet 18 and an outlet 20 allow a sample liquid to be passed through sample volume 16. The casing 10 is provided with optical windows 22, 24, 26. A light beam of intensity $I_o$ is directed through window 22 and against the interface between prism 12 and the sample liquid at an angle A which is near to and slightly less than, the critical angle. Accordingly, a portion of the light is reflected from the interface and leaves the prism through window 24 with an intensity $I_r$. The remaining light is transmitted through the sample liquid and exit prism 14 with a slight displacement due to the thickness of the sample volume 16 and leaves window 26 with an intensity $I_t$. As the refractive index of the sample liquid varies, the critical angle will also change so that the relative intensities of the reflected ($I_r$) and the transmitted ($I_t$) components of the incident light will exhibit a corresponding variation in accordance with the equations defining the Fresnel laws of reflection.

FIG. 2 illustrates the change in intensity of the reflected and transmitted portions of an incident light beam with a change in refractive index of a sample liquid. In this graph, the incident angle A is 60°, the refractive index of the entrance and exit prisms is 1.540 and the refractive index of the sample liquid for a critical angle of 60° is 1.333. Along the abscissa there is plotted the change in refractive index units of the liquid. The transmittance and reflectance are plotted on separate scales along the ordinate. The curves are displaced from one another due to the fact that transmittance curve 28 represents transmittance through two different interfaces, i.e., entering and leaving the sample liquid while the reflectance curve 30 represents reflectance from only the first interface. Curve 28 represents the transmittance of only the principal light rays which pass through the sample only once. Multiple reflected rays are ignored in curve 28. Plotted on each curve are the lines X and Y which indicate an increase in the sample of $5.6 \times 10^{-3}$ refractive index units. With such a change in the sample index, the transmittance through the interfaces would increase from .120 to .330, a change in intensity of .210 units or a modulation factor of 175 percent. The intensity of the corresponding reflected beam would vary from .656 to .427, a change in intensity of .229 units or a modulation factor of 35 percent. It will thus be apparent that, even though the transmitted component system has slightly lower sensitivity, it has five times the modulation in the cited example. Accordingly, for many applications this would be the preferred mode of operation of this invention. However, it is to be understood that the invention encompasses operation by either mode. Under some circumstances, for example when measuring samples having high absorptivity, it may be desirable to employ the reflected component mode of operation.

In an instrument constructed in accordance with this invention, the actual measurement between the X and Y points on either curve is made between two different bodies of fluid, one being the sample, and the other being the reference. As applied to liquid chromatography, for example, the reference fluid could be the carrier liquid, or solute, and the sample would be the effluent from the column.

In the illustrations of FIGS. 3–5, the principles set forth above are utilized in a simple differential refractometer system. In this system, the sample cell is constructed of an entrance prism 32 and an exit prism 34. Between corresponding faces of the prisms there is inserted a thin gasket 36, which may be constructed of any suitable material such as a thin plastic sheet. Gasket 36 is provided with two cutout openings defining a sample volume 38 and a reference volume 40. If continuous measurement of a sample stream is desired, it will be apparent that gasket may also be suitably chambered to provide inlet and outlet fluid channels to each of the volumes 38, 40. Light from a source S is collimated by a lens 42 and passes through prism 32 onto the two interfaces formed by the fluids in volumes 38, 40 and the surface of prism 32 which is common to both fluids. Some of the radiation is thereupon reflected as shown by the dotted lines and passes through collimating lens 44 onto detector D'. The transmitted light passes through prism 34 into collimating lens 46 which focuses it on detector D. It will be apparent that the light which passes to each of lenses 44, 46 consists of two beams, corresponding to the sample space 38 and the reference space 40. A rotating disc chopper 48 is positioned between the collimating lens 42 and prism 32 so that light is passed alternately through each of sample space 38 and reference space 40. The chopper is illustrated in FIG. 5 and will be seen to include an arcuate opening 50 for passing light through reference space 40 during one half cycle, and an arcuate opening 52 for passing light through the sample space 38 during the other half cycle. Accordingly, the output signal of each of detectors D, D' will exhibit a periodic fluctuation of amplitude which is proportional to the difference between the refractive indices of the fluids in sample space 38 and reference space 40.

An alternative construction is shown in plan view in FIG. 6 which is similar to that of FIG. 3 but wherein the chopper is omitted. In this embodiment, the light from the sample space 38 is passed through a lens 54 which focuses it on a detector D1. The light from the reference space 40 is passed through a lens 56 which focuses it on a detector D2. In an arrangement such as this, of course, no chopper is required, and the change in refractive index is indicated by the difference in output of the two detectors.

Figure 7:
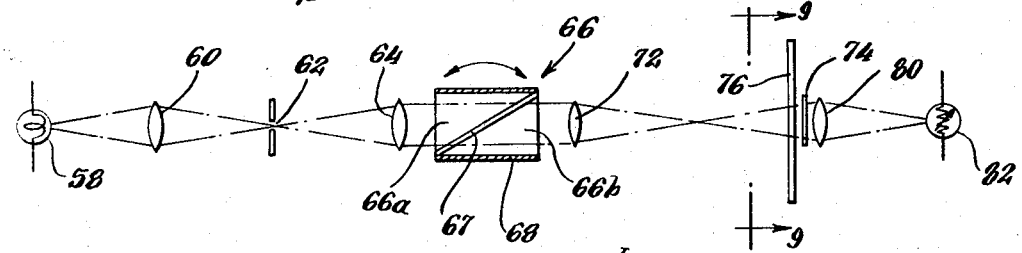
FIG. 7 is an elevational schematic illustration of still another modification of the invention.
Figure 9:
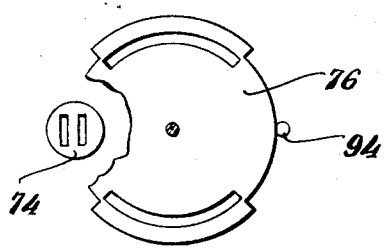
FIG. 9 is a cross section along line 9—9 of FIG. 7.
Figure 10:
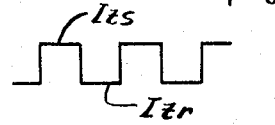
FIG. 10 is a wave shape diagram illustrating the operation of the invention.

In FIGS. 7, 8, and 9, there is illustrated a more detailed schematic of a differential refractometer instrument. This instrument is of the transmitted radiation type employing a single detector chopped photometer. A side view of the instrument optical system is illustrated in FIG. 7. The top view is shown in FIG. 8, which also includes the necessary circuitry for a recording differential refractometer. In these illustrations, light from a source lamp 58 is imaged on a slit 62 by lens 60. The light from slit 62 is then collimated by lens 64 and passes through cell 66 which includes entrance prism 66a and exit prism 66b and an intervening gasket 67 forming sample and reference liquid chambers as previously described. The prisms and gasket are contained in a housing 68 which is rotatable about an axis 70 (FIG. 8) to vary the angle at which light strikes the interface between prism 66a and each of the liquids. Lens 72 images the chambers of cell 66 on an aperture mask 74 which has two rectangular openings as shown in FIG. 9. These openings correspond to, and are slightly smaller than, the corresponding images of the liquid chambers. A chopper 76 is positioned near the mask 74 and is constructed as shown in FIG. 9 so as to alternately expose first one and then the other of the openings in mask 74 to the incident light. A pair of optical attenuators 75, 77 are also positioned to be insertable in the sample and reference beams for balancing purposes. These attenuators may be of any suitable construction. Flattened wires or blades, arranged for rotation in the beams have proven satisfactory, for example. The chopper 76 is rotated by the motor 78. The image of the slit 62 is formed by lens 80 on a detector 82. This image is alternately formed of light which has passed through first one and then the other of the two liquid chambers. The intensity of the light falling on detector 82 and the corresponding electrical output from the detector are represented in FIG. 10 wherein $I_{ts}$ indicates the intensity of the light transmitted through the sample chamber while $I_{tr}$ represents the intensity of the light transmitted through the reference chamber.

FIG. 8 illustrates the circuitry for the differential refractometer. A 115 volt, 60 cycle power supply 84 supplies power through the on-off switch 86 to the chopper motor 78 and to a D.C. power supply 88. In the disclosed embodiment, power supply 88 provides an output of 20 volts D.C. Source lamp 58 is placed in series with a demodulating lamp 90 and a current limiting resistor 92 across the D.C. output of power supply 88. The purpose of the demodulating lamp 90 will be explained below. The demodulating lamp 90 is positioned on one side of the chopper 76 and a demodulating detector 94 is positioned closely adjacent the other side of the chopper. The positioning of detector 94 relative to the blade of chopper 76 is indicated in FIG. 9.

The positive output from the D.C. power supply 88 is connected through an ammeter 96 to the detector 82. Detector 82 is a light sensitive resistor, such as a phototube or cadmium selenide cell. From detector 82 the output is applied to an electrical attenuator 98 in the form of a grounded resistor 100 provided with spaced taps 102 which are engaged by a movable contact 104. The output from contact 104 is amplified by a 20 cycle amplifier 106. The demodulating detector 94 is in series with the output of the amplifier 106 and supplies a recorder 108.

The operation of the refractometer of FIG. 8 will now be explained. The motor 78 in the illustrated embodiment rotates at 600 r.p.m. Each rotation of chopper 76 interrupts each of the sample and reference beams twice so as to generate two complete cycles each revolution as illustrated in FIG. 10. This results in a D.C. signal fluctuating at 20 cycles per second being impressed on the input to the amplifier 106 by virtue of the changing resistance of detector 82. In the present system, it is desired to indicate the difference between the transmitted intensities of the sample and reference beams ($I_{ts} - I_{tr}$). This would correspond to the amplitude difference between the positive and negative peaks impressed on the amplifier 106. The A.C. component of the varying D.C. signal is amplified by the amplifier 106 and passed through the detector 94. As will be apparent from FIG. 9, the light to detector 94 is interrupted in synchronism with the light passing through one of the chambers of the cell 66. Furthermore, detector 94 is of the on-off type and presents a very low resistance (for example, 300 ohms) when light from demodulating lamp 90 impinges thereon and a very high resistance (for example, 30,000 ohms) when light from the lamp is cut off by the chopper 76. Accordingly, detector 94 serves effectively as an on-off switch so as to pass the output from the amplifier 106 to the recorder 108 only during the positive half cycle. Thus, detector 94 serves to demodulate the signal from detector 82 so that the recorder 108 "sees" only a signal representative of the amplitude difference between the reference and sample beam intensities. As has been previously explained, this amplitude difference is representative of the difference in refractive index between the sample and reference liquids in the cell 66.

*Example*

In an actual test in accordance with this invention, an instrument schematically similar to that of FIGS. 7–9 was employed. Water was used as the reference liquid and an aqueous sucrose solution as the sample liquid. The angle of incidence (A) was adjusted to give approximately five percent transmittance with water in both chambers of the test cell. Sucrose solutions of known index were then passed through the sample chamber to calibrate the instrument in terms of differential refractive index. The results were as follows:

(1) Minimum detectable differential refractive index (equivalent to noise) was $\pm 5 \times 10^{-8}$ (about 0.3 part per million aqueous sucrose).

(2) Dynamic range (ratio of maximum to minimum detectable diqerential refractive index) was greater than 50,000.

(3) Typical drift rate per hour without temperature control was equivalent to approximately $10^{-6}$ differential refractive index.

(4) Time after sample introduction to reach differential temperature equilibrium equivalent to a differential refractive index of $10^{-7}$ (about .001° C.) was less than 2 minutes at room temperature.

(5) Sample volume required was less than 5 microliters. Minimum detectable quantity of solute was, therefore, approximately 1.5 nanograms ($1.5 \times 10^{-9}$ grams) sucrose.

To those skilled in the art, the foregoing performance will be recognized as superior to that which is practically possible using prior art methods. The fact that such performance can easily be achieved by practicing the present invention is attributable to the following important features of the preferred embodiment of the invention:

(1) The use of liquid-glass interfaces common to both sample and reference liquids and an illuminating optical system common to both interfaces affords an inherent stability to the differential Fresnel type measurement since the need for stability in external optical axes is eliminated. Also, the thin symmetrically disposed sample and reference volumes in contact with common surfaces afford rapid and close temperature equilibrium between sample and reference liquids.

(2) The use of the transmitted rather than the reflected light in the Fresnel type measurement allows the use of a nearly zero based and thus high modulation photometer system which tends to eliminate photometer noise and drift.

(3) The use of a beam switching chopper and a single detector in the photometer system further increases the stability of measurement.

It will be obvious to those skilled in the art that the present invention provides an extremely novel, useful and unobvious solution to a difficult problem. By means of the present invention, differential refractive index is detected by referencing two different materials to a common third material and measuring differential transmittance or reflectance. An extremely small sample volume is required. For example, the thickness of the gasket and the corresponding sample space may be made as small as .001 inch. This results in rapid differential temperature equilibration. It also results in extremely low absorption when utilizing the transmission mode of operation.

It will be apparent that the preceding has disclosed the preferred embodiment of this invention. However, a number of variations and modifications may be made therein. For example, in most optical systems employing choppers, the chopper is positioned at the source end of the system. In the present invention, rotation of the chopper ahead of the cell may cause slight deviations in the light beam due to the Schlieren effect. These angular deviations affect the transmittance (or reflectance) of the cell. Positioning the chopper after the cell as shown in FIGS. 7 and 8, however, eliminates the problem so that the system detects the intensity of the transmitted radiation with greater accuracy. However, this positioning of the chopper, while preferred, is not a limiting requirement of the present invention. Furthermore, the term "light" has been employed throughout the foregoing description. The invention, however, is not to be construed as limited to the use of frequencies solely within the visible region. Electromagnetic radiation of any frequency may be employed including, but not limited to, infrared and ultraviolet radiation. Many other variations and modifications of this invention will also be apparent to those skilled in the art. Accordingly, it is to be understood that the foregoing description is illustrative only rather than limiting. This invention is limited only by the scope of the following claims.

What I claim as new and desire to secure by Letters Patent of the United States is:

1. A differential refractometer which comprises: a source of electromagnetic radiation; a base element of a radiation transparent material; means for retaining both a sample and a reference material against the surface of said base element to form respective first and second interfaces therewith; means for directing radiation from said source along a single optical axis onto each of said first and second interfaces at an angle thereto; means for adjusting the angle of incidence of said radiation on said interfaces to an angle slightly less than the critical angle or the angle corresponding thereto; detection means responsive to first and second radiation intensities to produce first and second electrical signals proportional thereto; means for directing radiation leaving each of said first and second interfaces against said detection means; and readout means for converting said electrical signals to a visually observable indication of the difference in refractive index of the sample and reference materials.

2. The refractometer of claim 1 wherein said means for directing radiation is positioned to direct radiation reflected from each of said interfaces against said detection means.

3. The refractometer of claim 1 wherein said means for directing radiation is positioned to direct radiation transmitted through each of said interfaces against said detection means.

4. The refractometer of claim 1 wherein said detection means comprises a single detector.

5. The refractometer of claim 4 wherein said means for directing includes chopper means for alternately, sequentially interrupting radiation from said first and second interfaces.

6. The refractometer of claim 1 wherein said means for retaining comprises enclosure means defining first and second spaced openings therein, said openings cooperating with a single planar surface of said base material to form respective sample and reference volumes.

7. The refractometer of claim 6 wherein said enclosure means comprises: a gasket positioned against said planar surface and defining said openings; and a clamping member securing said gasket to said surface.

8. The refractometer of claim 7 wherein said clamping member is of a radiation transparent material and includes at least one planar surface adjacent said gasket in spaced parallel relationship to the single planar surface of said base material.

9. A differential refractometer which comprises: a light source; an analysis cell including a transparent first element having at least one planar surface, a transparent second element having at least one planar surface parallel to and spaced from the planar surface of said first element, and a spacer element between the planar surfaces defining a sample and a reference volume therebetween; means for directing light from said source through said first element, said sample and reference volumes, and said second element at an angle to the planar surface of said first element slightly less than the critical angle; means for selectively varying the angle of incidence between said light and the planar surface of said first element; photodetector means positioned to receive light transmitted through each of said sample and reference volumes; chopper means between said second element and said photodetector means for alternately sequentially interrupting radiation from said sample and reference volumes to said photodetector means; and readout means responsive to the output of said photodetector means to provide an indication of the relative intensities of the light transmitted through each of said sample and reference volumes.

References Cited

UNITED STATES PATENTS 2,442,910   6/1948   Thomson _____ 88—14

OTHER REFERENCES

Photoelectric Refractometer, Karrer et al., Journal of the Optical Society of America, vol. 36, No. 1, pp. 42–46, January 1946.

JEWELL H. PEDERSEN, *Primary Examiner.*

B. J. LACOMIS, *Assistant Examiner.*